United States Patent
Ahn et al.

(10) Patent No.: US 8,382,055 B2
(45) Date of Patent: Feb. 26, 2013

(54) CRADLE FOR PORTABLE COMMUNICATION DEVICE

(75) Inventors: Hae-Won Ahn, Gyeongsangbuk-do (KR); Won-Hyun Park, Gyeongsangbuk-do (KR)

(73) Assignees: Samsung Electronics Co., Ltd, Samsung-ro, Yeongtong-gu, Suwon-si, Gyeonggi-do (KR); JMC Co., Ltd., Gojan-dong, Namdong-gu, Incheon (KR)

( * ) Notice: Subject to any disclaimer, the term of this patent is extended or adjusted under 35 U.S.C. 154(b) by 96 days.

(21) Appl. No.: 13/112,055

(22) Filed: May 20, 2011

(65) Prior Publication Data
US 2011/0309221 A1    Dec. 22, 2011

(30) Foreign Application Priority Data
Jun. 17, 2010    (KR) .................. 10-2010-0057731

(51) Int. Cl.
*A47B 91/00*    (2006.01)
(52) U.S. Cl. .................. 248/346.01; 248/309.1
(58) Field of Classification Search ............ 248/346.01, 248/682, 688, 309.1, 310, 316.4; 361/679.01; 379/455
See application file for complete search history.

(56) References Cited

U.S. PATENT DOCUMENTS

| | | | |
|---|---|---|---|
| 5,457,745 A * | 10/1995 | Wang | 379/454 |
| 5,788,202 A * | 8/1998 | Richter | 248/316.4 |
| 7,540,459 B2 * | 6/2009 | Asano et al. | 248/309.1 |
| 7,551,458 B2 * | 6/2009 | Carnevali | 361/807 |
| 2006/0278788 A1 * | 12/2006 | Fan | 248/309.1 |
| 2007/0087596 A1 * | 4/2007 | Chung et al. | 439/131 |
| 2011/0096303 A1 * | 4/2011 | Horii | 353/119 |
| 2011/0194233 A1 * | 8/2011 | Ahn et al. | 361/679.01 |
| 2012/0127641 A1 * | 5/2012 | Seo et al. | 361/679.01 |
| 2012/0146914 A1 * | 6/2012 | Pegg | 345/169 |

* cited by examiner

*Primary Examiner* — Ramon Ramirez
(74) *Attorney, Agent, or Firm* — Cha & Reiter, LLC

(57) ABSTRACT

A cradle for a portable terminal includes a first housing with a keypad mounting area, and a second housing is adapted to be cradled obliquely after being slid back from the first housing while being maintained in opposite to the first housing. First and second members, a first rotary link coupled to the first member, and slidably coupled to the second member, the second member being rotatable about a rotary axis to position the first and second members obliquely after the second member is slid. A second rotary link is rotatably coupled to and adapted for supporting the first link. A rotary unit is formed integrally with and protruding from the second rotary link. A link stopper is formed integrally with and protruding from the second rotary link, and the link stopper is coupled to a stopper formed on the first rotary link.

11 Claims, 17 Drawing Sheets

CRADLE FOR PORTABLE COMMUNICATION DEVICE

CLAIM OF PRIORITY

This application claims priority under 35 U.S.C. §119 from a patent application entitled "Cradle For Portable Communication Device" filed in the Korean Intellectual Property Office on Jun. 17, 2010 and assigned Serial No. 10-2010-0057731, the contents of which are hereby incorporated by reference in its entirety.

BACKGROUND OF THE INVENTION

1. Field of the Invention

The present invention relates to a cradle for a portable communication device. More particularly, the present invention relates to a cradle unit in which a rotary unit and a link stopper are integrally formed with rotary links, respectively.

2. Description of the Related Art

In general, a "portable communication device" means a device which allows a user to conduct wireless communication with a counterpart while the user is carrying the device. For example, portable communication devices are classified into bar-type, flip-type, folder-type, and slide-type wireless terminals, on the basis of their external appearances. Each of the conventional communication devices enumerated above essentially includes an antenna, a data input/output device, and a data transceiver. Of course, a keypad is generally employed as the data input/output device.

The slide-type wireless terminal includes a main body with a keypad, a sliding body with a display unit, and a sliding module for allowing the sliding body to be slid on the main body.

However, such a conventional slid-type wireless terminal has a problem as follows: since a separate cradle is used so as to make it convenient to see information displayed on the display unit, an uneconomical problem is caused in a user's position.

It would be more convenient for a user to see the information displayed on the display unit if the display unit is obliquely positioned. For example, in the past, unless a cradle were separately provided, a user may see the information displayed on the display unit in a state in which the user grasped and positioned the main body of the terminal obliquely. However, since no separate cradle is provided on a table or the like, it is inconvenient to read the screen displayed on the display unit in a state in which the terminal is located on the table or the like.

In order to solve the above-mentioned problem, a sliding cradle for a portable communication device has been developed, which allows a display unit to be positioned obliquely after the display unit is slid.

As shown in FIGS. 1 to 3, a conventional sliding cradle 10 for a portable communication device includes first and second housings 20 and 30, a guide unit 40, a movable plate 50, a hinge stopper 60, a rotary link 70, a stopper pin 80, a hinge pin 90, an engagement/disengagement ball 91, a coil spring 92, and an E-ring 93.

As shown in FIGS. 2 and 3, the hinge pin 90 allows the rotary link 70 and the hinge stopper 60 to be rotated, and the stopper pin 80 limits the rotation of the rotary link 70 and the hinge stopper 60. The engagement/disengagement ball 91 provides a click feeling as being engaged with or disengaged from a hole formed in the hinge stopper when the rotary link 70 and the hinge stopper 60 are rotated.

However, since the conventional sliding cradle for a portable communication device having first and second housings includes the guide movement unit, the movable plate, the hinge stopper, the rotary link, the stopper pin, the engagement/disengagement ball, the coil spring, and the E-ring, the manufacturing cost for the final product is very high due to the large number of parts. In addition, since it is necessary to fasten the E-ring after the stopper pin and the hinge pin are coupled to the hinge stopper and the rotary link, respectively, the engagement/disengagement ball may escape or may be lost by being dropped when assembling the engagement/disengagement ball and the coil spring. As a result, the process for assembling the final product is very complicated and difficult, whereby the length of time for assembling the final product is increased, and the productivity of the final product is deteriorated. The sheer number of parts also do not wear at equal rates, and their interaction of some many pieces increase the probability of failure of the cradle to function properly for a length of time.

Therefore, what is needed is a cradle for a portable communication device having a stopper pin and hinge pins which are integrally formed with a hinge stopper and a rotary link, respectively, without needing separate pins and an E-ring coupled to the pins that are essentially employed in a conventional cradle for a portable communication device, so that the number of essential parts can be substantially reduced and the assembling process can be made to be simple and easy, whereby the length of time for the assembling process can be reduced, and hence the productivity of the final product can be improved.

SUMMARY OF THE INVENTION

Accordingly, the present invention in an exemplary aspect provides a cradle for a portable communication device having a rotary unit and a link stopper which are integrally formed and protrude from rotary links without using pins and an E-ring which are separately provided at the time of assembling a conventional existing cradle, whereby the manufacturing cost for the final product can be saved, and the number of steps and the length of time for assembling the final product can be reduced.

Also, another exemplary aspect of the present invention provides a cradle for a portable communication device having a click unit for providing a click feeling when the rotary links are rotated, wherein the click unit is formed with an anti-escaping ridge for preventing the click unit from escaping at the time of assembling the final product, whereby the assembling process of the final product can be improved.

Also, another exemplary aspect of the present invention provides a cradle for a portable communication device, wherein the rotary links and the rotary stopper are formed from a carbon tool steel material and a stainless steel material, so that the manufacturing cost of the final product can be saved, and the strength of the final product can be improved.

In accordance with an exemplary aspect of the present invention, there is provided a cradle for a portable terminal having a first housing with a keypad mounting area, and a second housing adapted to be cradled obliquely after being slid while being maintained in a state positioned oppositely in relation to the first housing, wherein the cradle includes: first and second members; a first rotary link coupled to the first member, and slidably coupled to the second member, the second member being adapted to be rotated about a rotary axis so as to make the first and second members be positioned obliquely after the second member being slid; a second rotary link rotatably coupled to and adapted to support the first link;

a rotary unit formed integrally with and protruding from the second rotary link, the rotary unit providing the rotary axis, and being coupled to a rotary hole formed in the first rotary link so as to allow the first rotary link to be rotated; and a link stopper formed integrally with and protruding from the second rotary link, the link stopper being coupled to a stopper formed on the first rotary link so as to limit the rotation of the first rotary link.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, exemplary embodiments of the present invention will be described with reference to the accompanying drawings. In the following description, a detailed description of well-known functions and configurations incorporated herein may be omitted when it may make the subject matter of the present invention rather unclear.

Figure 1:
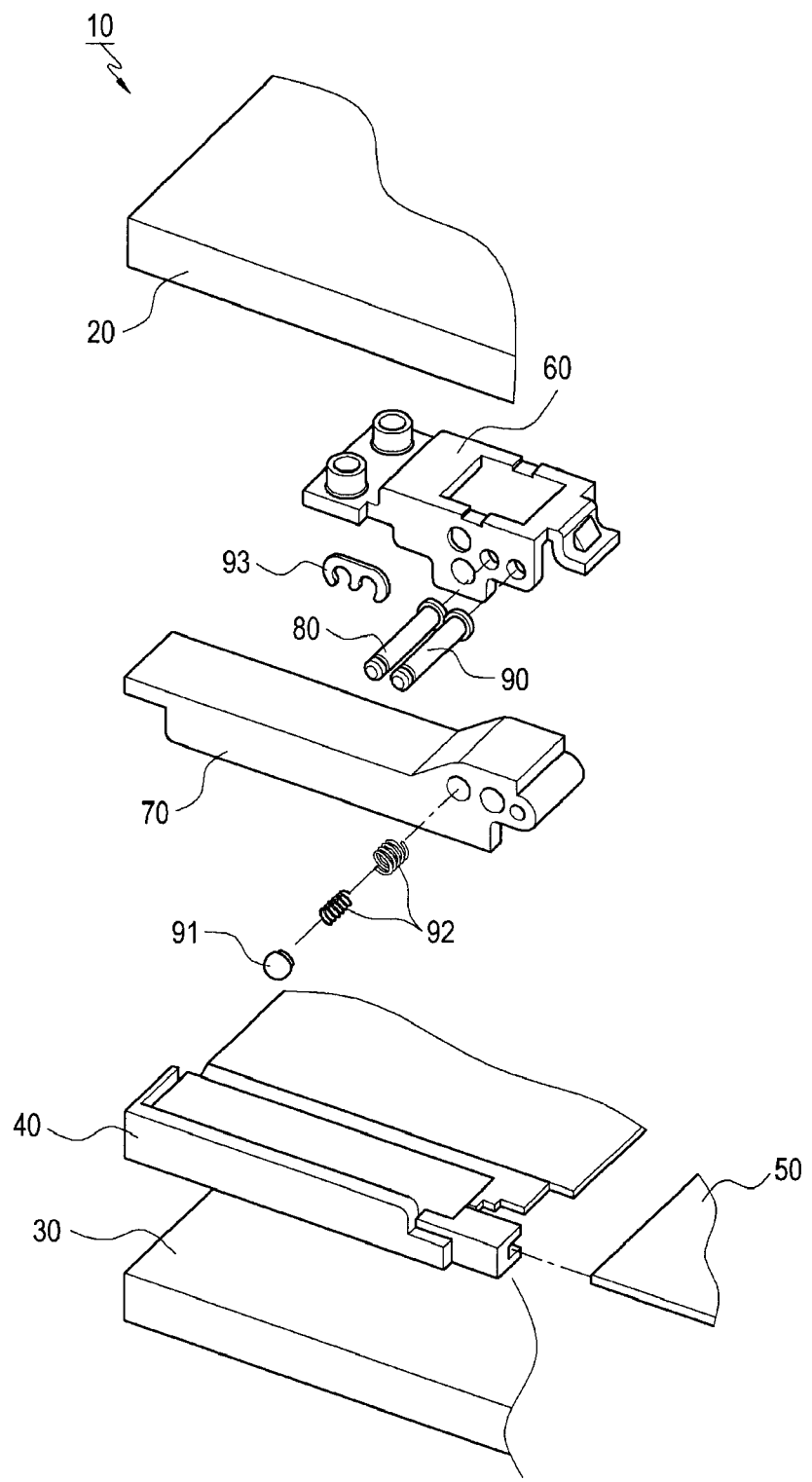
FIG. 1 is an exploded perspective view showing a conventional cradle for a portable communication device.
Figure 2:
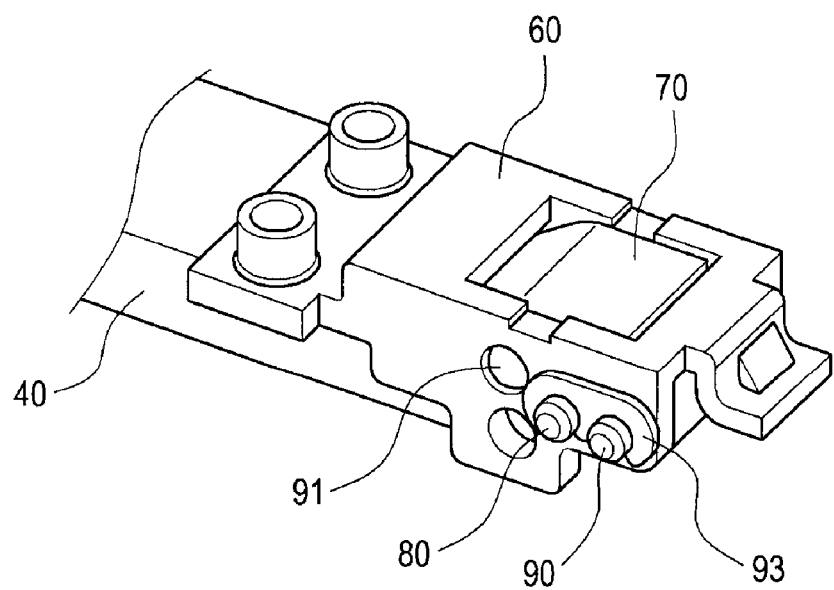
FIG. 2 is a perspective view showing the conventional cradle of FIG. 1 in an assembled state.
Figure 3:
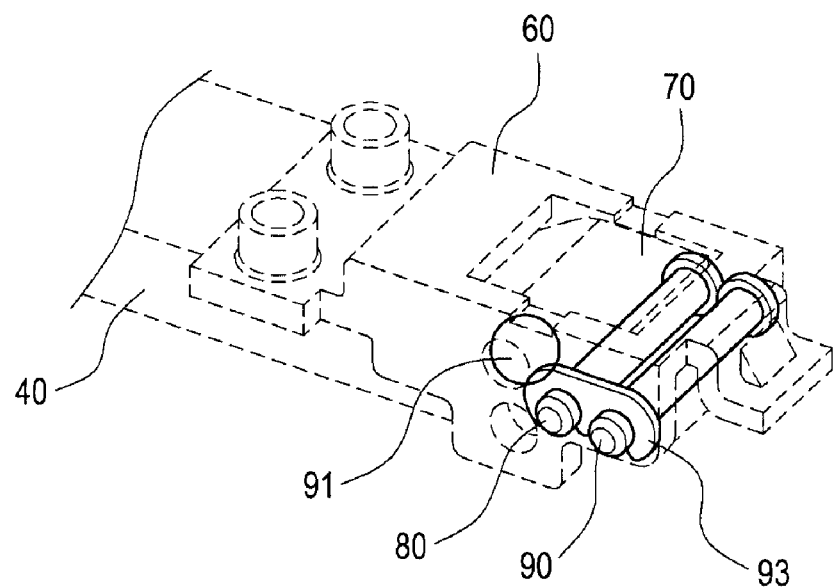
FIG. 3 is a perspective view showing the internal configuration of the conventional cradle in the state shown in FIG. 2.
Figure 4:
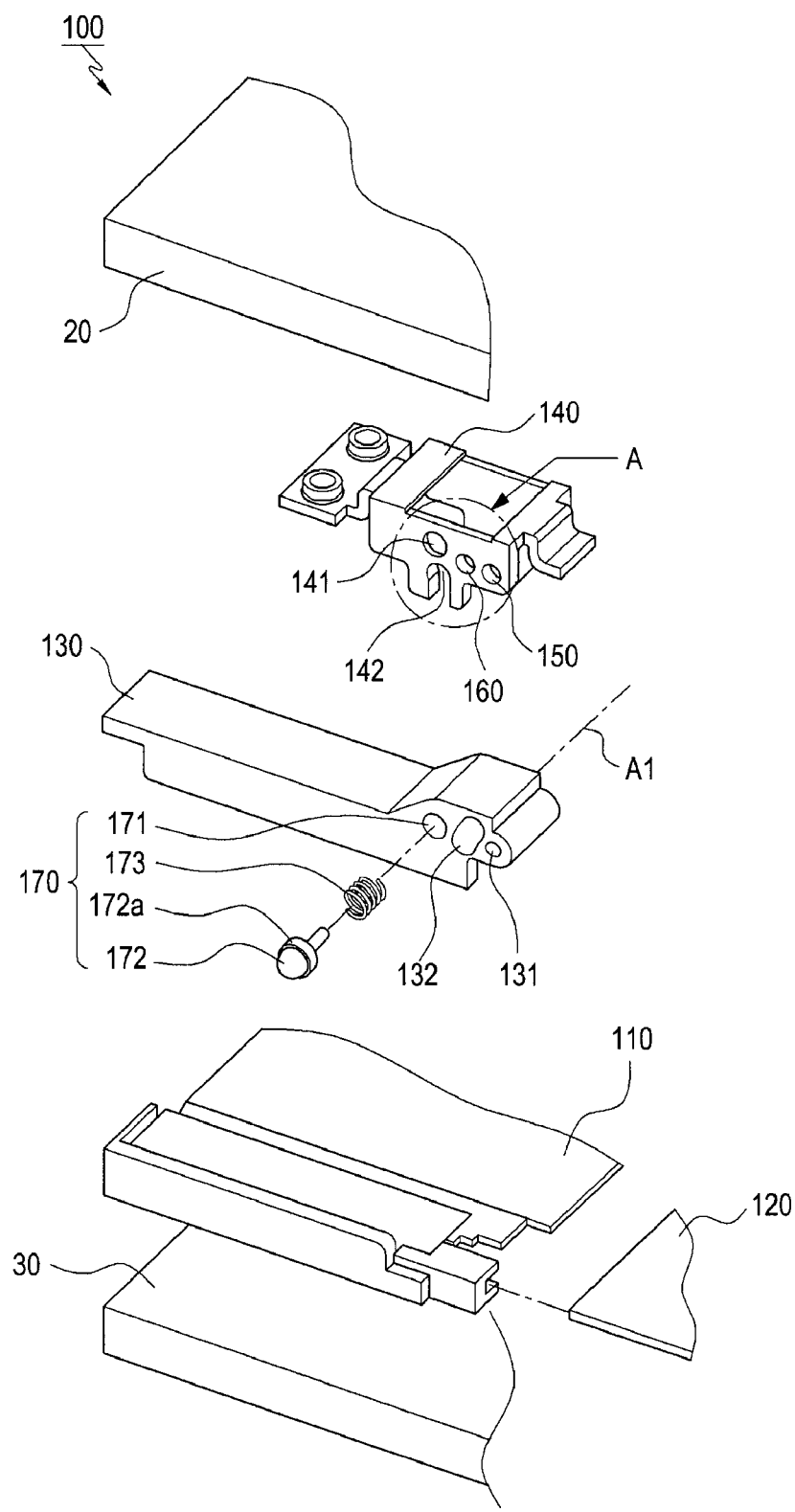
FIG. 4 is an exploded perspective view showing a cradle for a portable communication device in accordance with an exemplary embodiment of the present invention.
Figure 5:
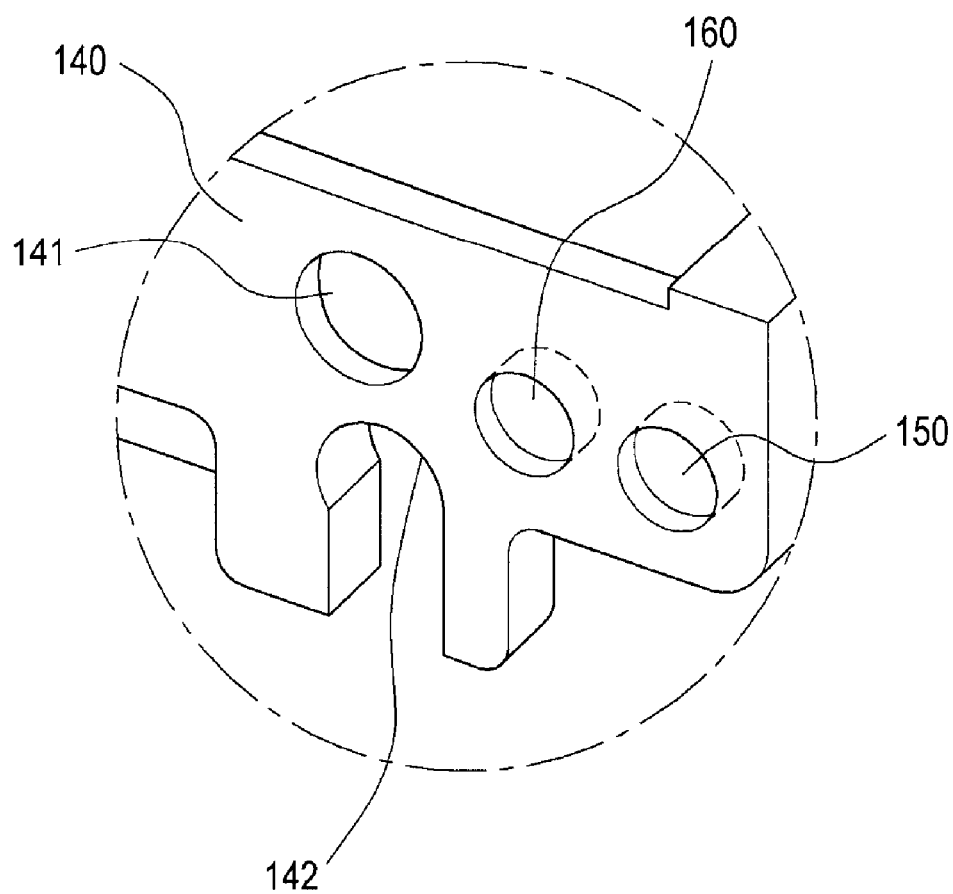
FIG. 5 is an enlarged exploded perspective view of the "A" part in FIG. 4.
Figure 6:
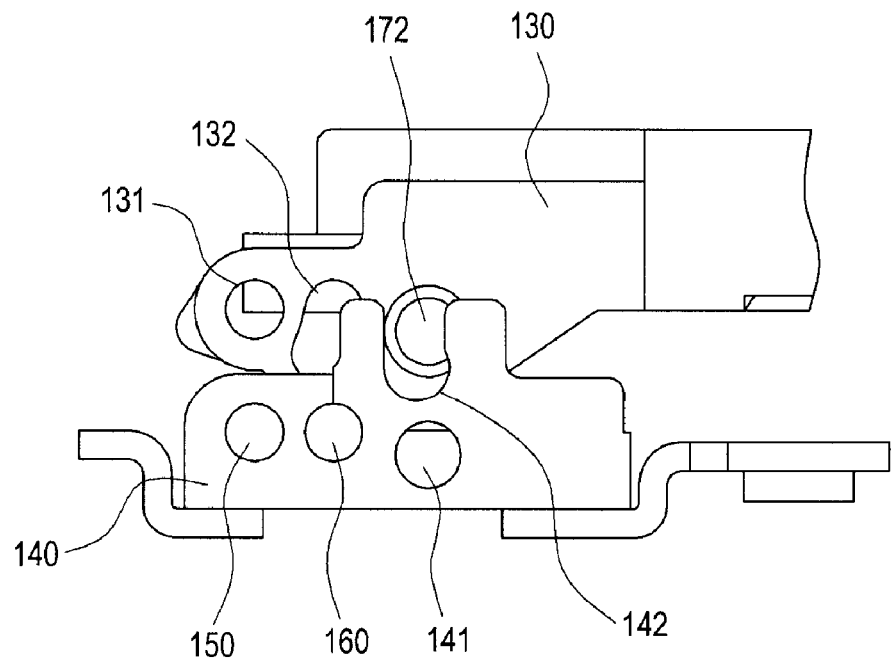
FIG. 6 is a side view showing an assembling process of the inventive cradle shown in FIG. 4.

As shown in FIGS. 4 to 23, a cradle 100 for a portable communication device includes first and second housings 20 and 30, first and second members 110 and 120, first and second rotary links 130 and 140, a rotary unit 150, and a link stopper 160. As shown in FIG. 16, the first housing 20 is provided with a keypad mounting area 21, and the second rotary link 140 (FIG. 4) is coupled to the first housing 20. The second member 120 is coupled to the second housing 30 which is provided with a display unit 31 (FIG. 16), wherein the display unit 31 is provided on the top side of the second housing 30 such that the display unit 31 is cradled obliquely after it is slid in a state in which it is positioned oppositely in relation to the first housing 20. The first member 110 is coupled to the first rotary link 130 so that first member 110 can rotate the second member 120 to be positioned obliquely after the second member 120 is slid, and the second member 120 is slidably coupled to the first rotary link 130 so that the second member 120 can be rotated after it is slid. The first rotary link 130 is slidably coupled to the second member 120. In addition, the first rotary link 130 is coupled to the first member 110. As a result, after the second member 120 is slid, the first and second members 110 and 120 can be rotated about a rotary axis A1, so that they are positioned obliquely. The second rotary link 140 is coupled to the first housing 20 so as to support and allow the first rotary link 130 to rotate about the rotary axis A1. The rotary unit 150 is integrally formed with and protrudes from the second rotary link 140, so that the rotary unit 150 provides the rotary axis A1 and is coupled to the rotary hole 131 formed in the first rotary link 130 so as to allow the first rotary link 130 to be rotated. The link stopper 160 is integrally formed with and protrudes from the second link 140 so that the link stopper 160 is coupled to a stopper 132 formed on the first rotary link 130 and limits the rotation of the first rotary link 130.

As shown in FIGS. 4, 5 to 9, and 18 to 23, the first rotary link 130 has a coupling hole 171, wherein a click unit 170 is provided in the coupling hole 172. The click unit 170 is adapted to be engaged with or disengaged from first and second engagement/disengagement holes 141 and 142 formed in the second rotary link 140, so that the click unit 170 supports the first rotary link 130 to limit the rotation of the first rotary link, and provides a "click" feeling when the second member is rotated.

As shown in FIGS. 4, 5 to 9, 12 to 15, and 23, the click unit 170 preferably includes a click lug 172, and an elastic member 173, and the coupling hole 171 is formed in the first rotary link 130 so as to allow the click lug 172 to be moved. The click lug 172 is provided to correspond to the first and second engagement/disengagement holes 141 in position, and is movably positioned in the coupling hole 171 so that the click lug 172 can provide a click feeling when it is engaged with or disengaged from the first and second engagement/disengagement holes 141 and 142. The elastic member 172 is provided within the coupling hole 171 so as to provide elastic force for allowing the click lug 171 to be engaged with or disengaged from the first and second engagement/disengagement holes 141.

As shown in FIGS. 4, 5 to 9, and 12 to 15, the click lug 172 is formed in a semispherical shape so that it can be easily engaged with or disengaged from the engagement/disengagement holes 141 and 142, and an anti-escaping ridge 172a is formed on the click lug 172 so as to prevent the click lug 172 from escaping from the coupling hole 172, which was a known problem in the conventional devices. The rotary unit 150 is formed by a rotary lug 172 to be rotatable in the rotary hole, and the link stopper 160 is formed by a stopper lug 172, wherein the stopper lug 172 comes into contact with the rotary unit 150 as the rotary unit 150 is rotated in the stopper 132, thereby limiting the rotation of the first rotary link 130.

The click lug 172 is formed from a stainless steel material. The first and second rotary links 130 and 140 are formed preferably from a carbon tool steel.

Figure 7:
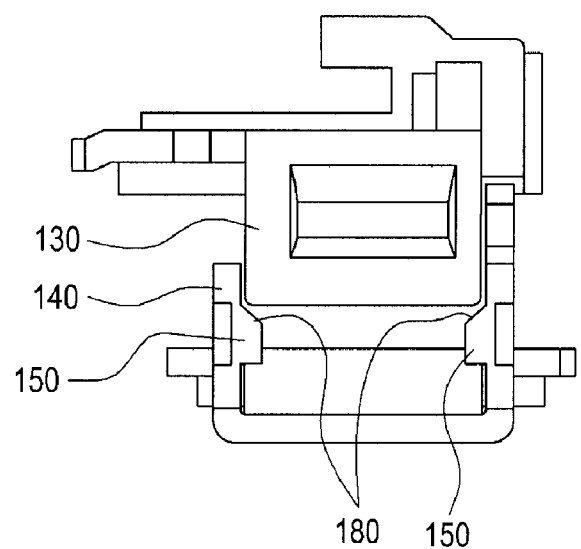
FIG. 7 is a front view showing an assembling process of the inventive cradle shown in FIG. 4.

As shown in FIG. 7, the rotary unit 150 and the link stopper 160 are formed with guide slopes 180 so that they can be easily engaged with the first rotary link 130.

Herein, a portable communication device is illustrated as a representative example for applying the inventive cradle 100. However, a person of ordinary skill in the art should understand and appreciate that in addition to the portable communication device shown herein the drawings, the inventive cradle can be applied to various types of terminals (for example, bar-type, folder-type, slide-type and swing-type terminals) which are provided with a cradle.

The portable communication device illustrated herein may cover all kinds of information communication devices and multimedia devices, such as a portable multimedia player (PMP), an MP3 player, a navigation device, a game machine, a notebook computer, a signboard, a TV set, a digital broadcasting player, a personal digital assistant (PDA), and a smart phone, and applications thereof, including all kinds of mobile communication terminals operated on the basis of communication protocols corresponding to various communication systems.

A process for assembling the inventive cradle for a mobile communication device, and the operation of the cradle will be described in more detail herein after with reference to FIGS. 4 to 23.

As shown in FIGS. 4 to 23, the inventive cradle 100 for a portable communication device includes the first and second housings 20 and 30, the first and second members 110 and 120, the first and second rotary links 130 and 140, rotary unit 150, and the link stopper 160.

As shown in FIGS. 4, and 6 to 9, preferably the elastic member 173 is inserted into the coupling hole 171 formed in the first rotary link 130, and then the click lug 172 of the click unit 170 is inserted into the coupling hole 171. Since the click lug 172 is formed with the anti-escaping ridge 172a, the anti-escaping ridge 172a of the click lug 172 comes into contact with the inlet of the coupling hole 171 as the click lug 172 is inserted into the coupling hole 171. As a result, the click lug 172 is prevented from escaping from the coupling lug 171.

Then, as shown in FIGS. 6 to 9, the first rotary link 130 is coupled to the second rotary link 140. At this time, the first rotary link 130 comes into contact with the guide slopes 180 formed on the rotary unit 150 and the link stopper 160, which are formed in the second rotary link 140.

Since the rotary unit 150 and the link stopper 160 are integrally formed with and protrude from the second rotary link 140, the first rotary link 130 is guided along the guide slopes of the rotary unit 150 and the link stopper 160, and is coupled to the second rotary link 140.

At this time, as shown in FIGS. 12 to 15, the rotary unit 150 is rotatably coupled to the rotary hole of the first rotary link 130, and the link stopper 160 is coupled to the stopper 132 of the first rotary link 130.

At this time, the click lug 172 provided in the first rotary link 130 is inserted into the first engagement/disengagement hole 141 formed in the second rotary link 140.

Then, as shown in FIGS. 11 to 15, the second rotary link unit 140 is coupled to the first housing 20 having the keypad mounting area 21, and the first rotary link 130 is coupled to the first member 110. The first rotary link 130 is also coupled to the second member 120 to be slidable.

Figure 11:
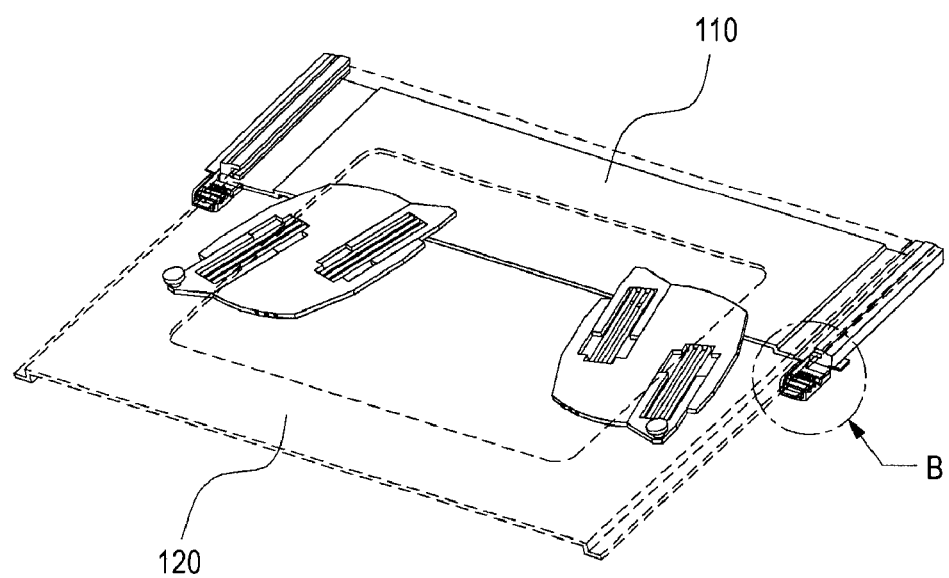
FIG. 11 is a perspective view showing first and second members of the inventive cradle in the assembled state.

As shown in FIGS. 11 and 16, the second member 120 is coupled to the second housing 30 provided with the display unit 31. The keypad mounting area 12 is adapted to be provided with a keypad as an input/output means.

Figure 16:
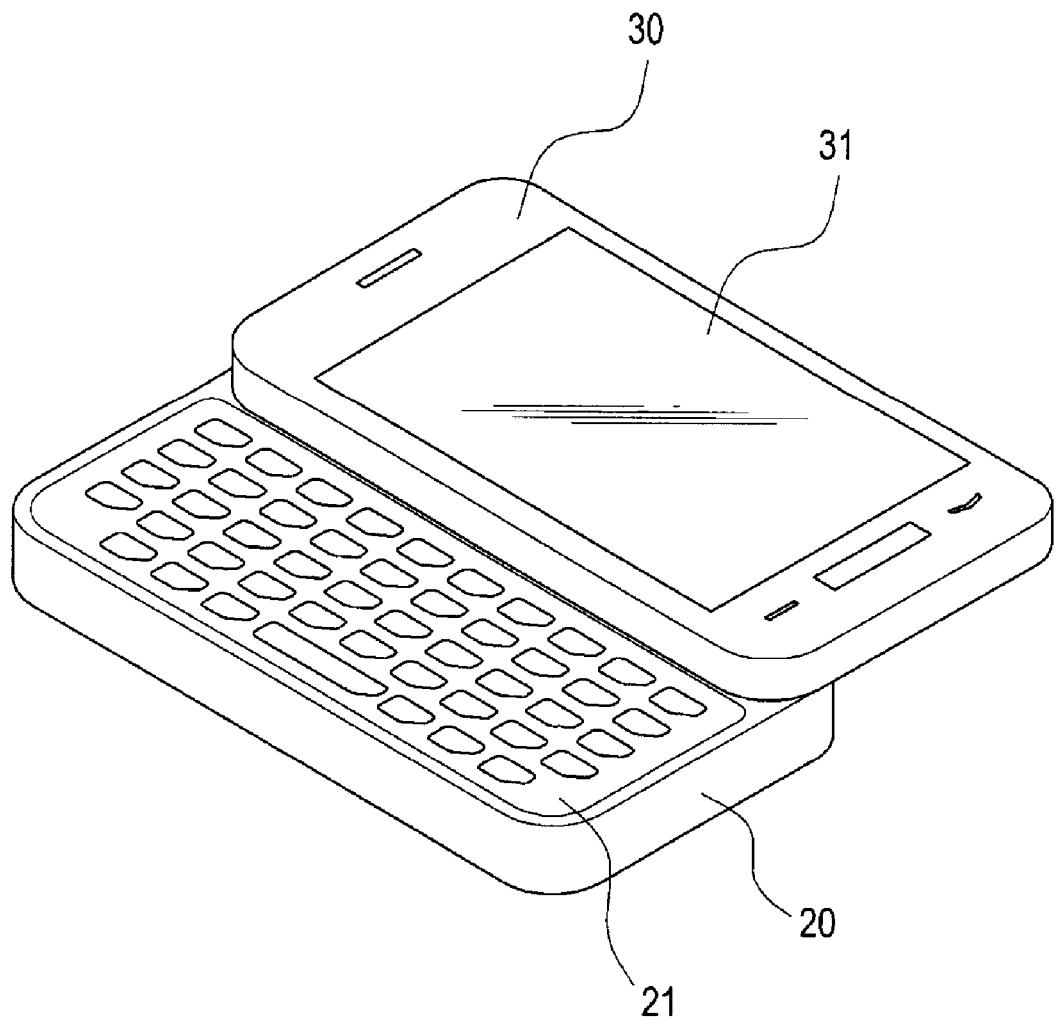
FIG. 16 is a perspective view showing a portable communication device after the second housing has been slid.
Figure 17:
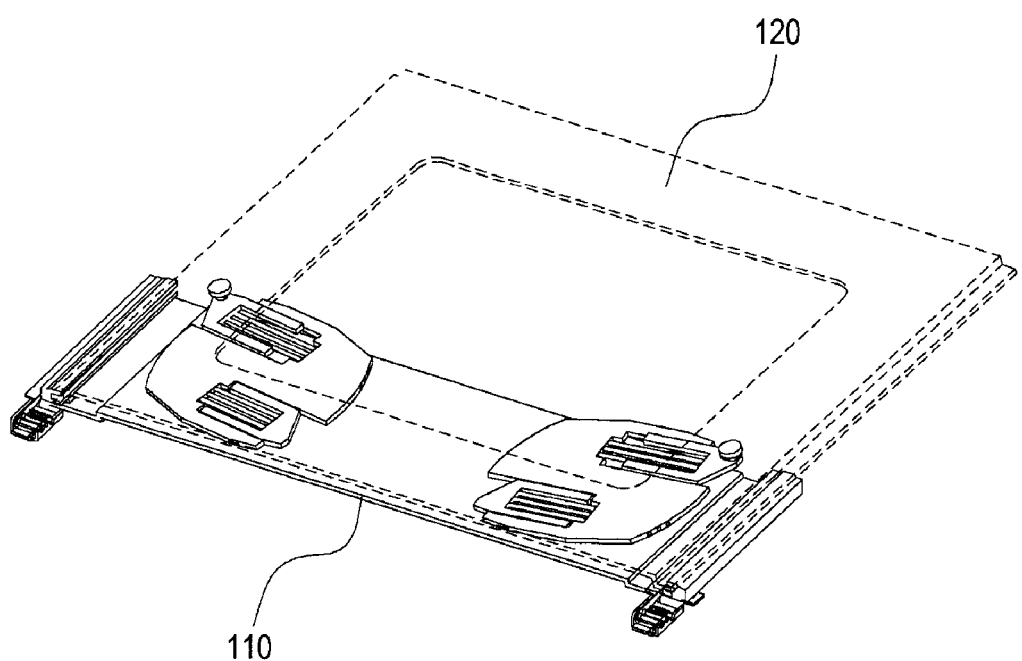
FIG. 17 is a perspective view showing the inventive cradle after the second member has been slid.

In this state, as shown in FIGS. 16 and 17, if the second housing 30 is slid, the second member 120 is also slid, and the second member 120 is slid by the first rotary link 130.

As shown in FIGS. 20 to 23, the first rotary link 130 is rotated about the rotary axis A1 of the rotary unit so as to allow the first and second members 110 and 120 to be positioned obliquely, after the second member 120 is slid.

Figure 23:
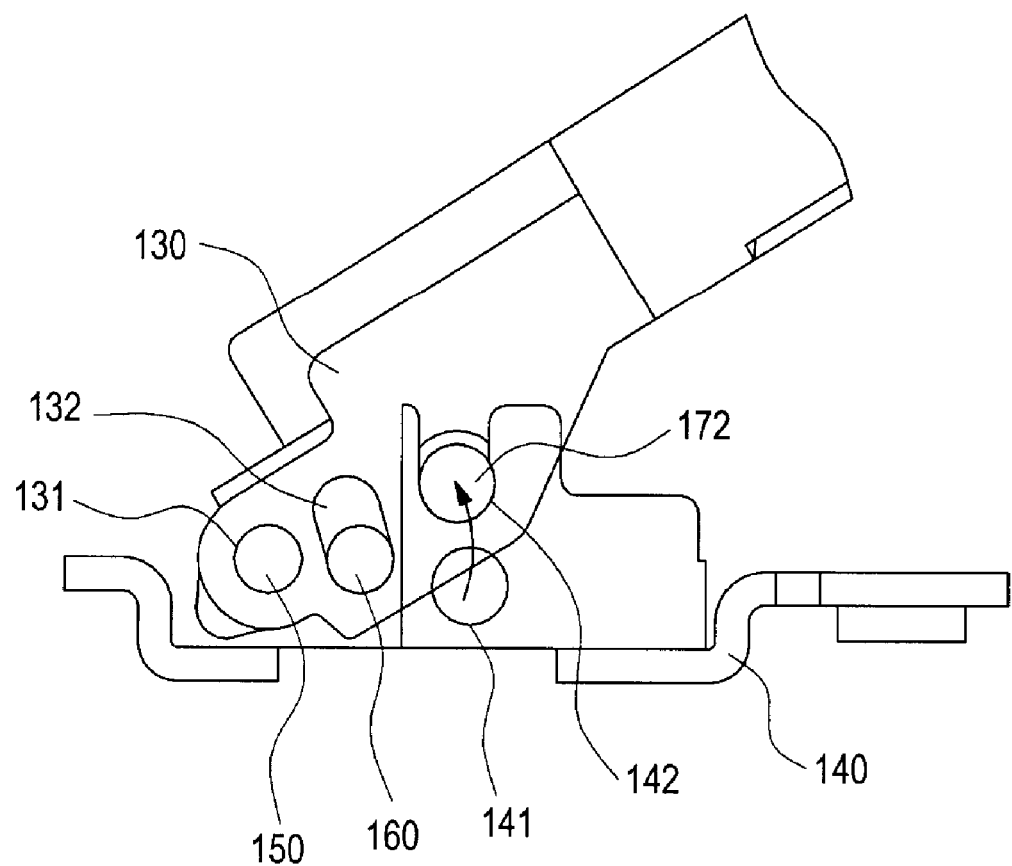
FIG. 23 is a side view showing the inventive cradle after the cradle has been operated.

At this time, as shown in FIG. 23, the stopper 132 of the first rotary link 130 is also rotated, and the link stopper 160 comes into contact with the stopper 132, thereby limiting the rotation of the first rotary link 130 and also limiting the rotation of the first and second members 110 and 120.

At this time, the click lug 172, which is provided in the first rotary link 130, is also rotated. The click lug 172 escapes from the first engagement/disengagement hole 141 and then the click lug 172 is inserted into the second engagement/disengagement hole 142.

Figure 15:
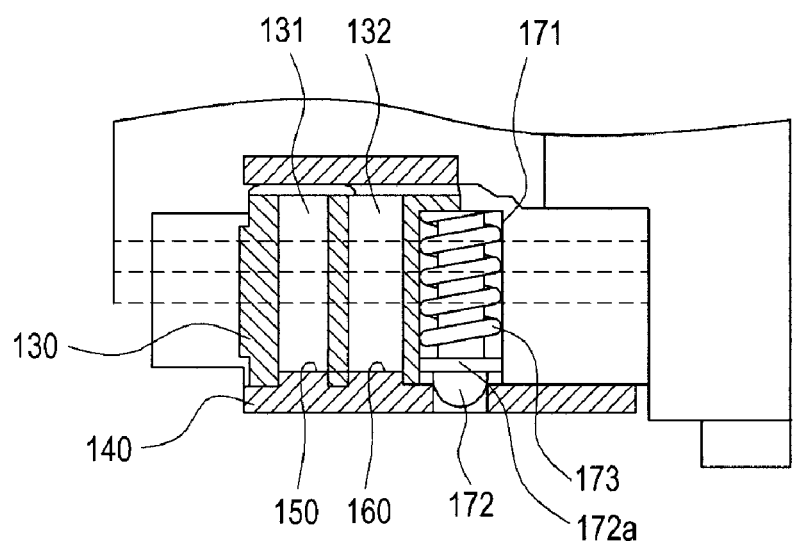
FIG. 15 is a top plan view showing partially in cross-section the inventive cradle for a portable communication device prior to operation.

As shown in FIGS. 15 and 23, the click lug 172 is inserted into the coupling hole of the first rotary link when it escapes from the first engagement/disengagement hole 141, and then protrudes again due to the elastic member 173. Then, the click lug 172 is inserted into the second engagement/disengagement hole 142.

Figure 10:
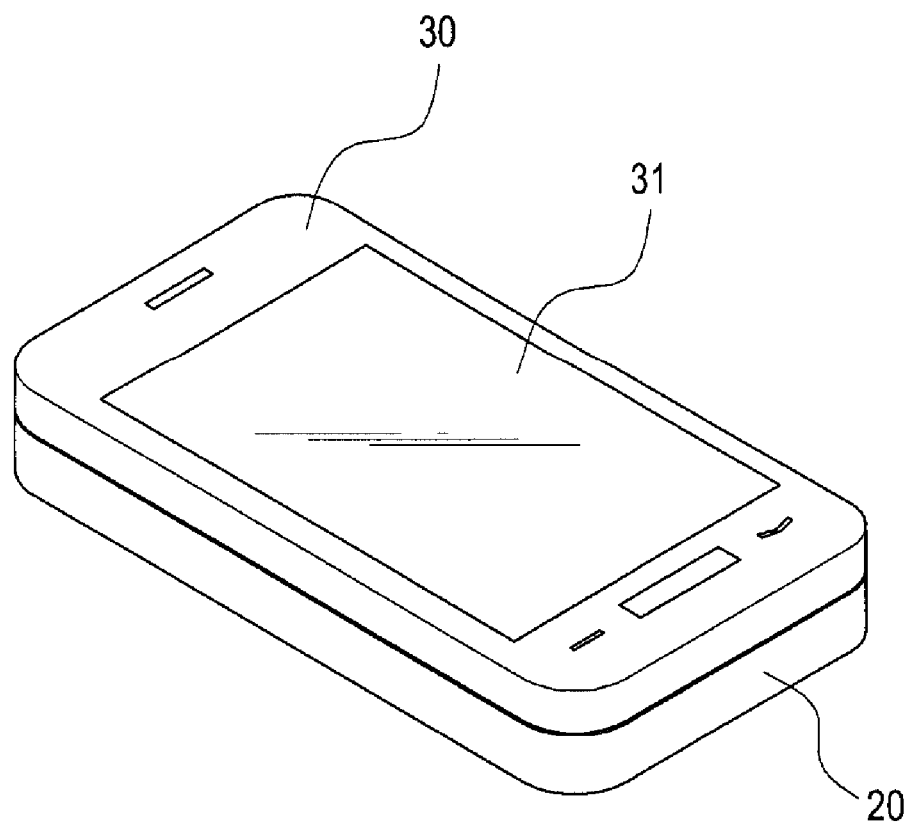
FIG. 10 is a perspective view showing a portable communication device prior to operating the inventive cradle of the portable communication device.

Here, if the second housing 30 is returned to its original position as shown in FIGS. 10 and 11, the second housing 30 is rotated again about the rotary axis 150 and slid, thereby being positioned oppositely in relation to the first housing 20.

Likewise, as shown in FIGS. 16 to 19, the first and second members 110 and 120 are also rotated, and the second member 120 is slid by the first rotary link 130.

As shown in FIGS. 20 to 23, the first rotary link 130 is rotated about the rotary axis A1 by the rotary unit 150, which is integrally formed with and protrudes from the second rotary link 140.

Figure 18:
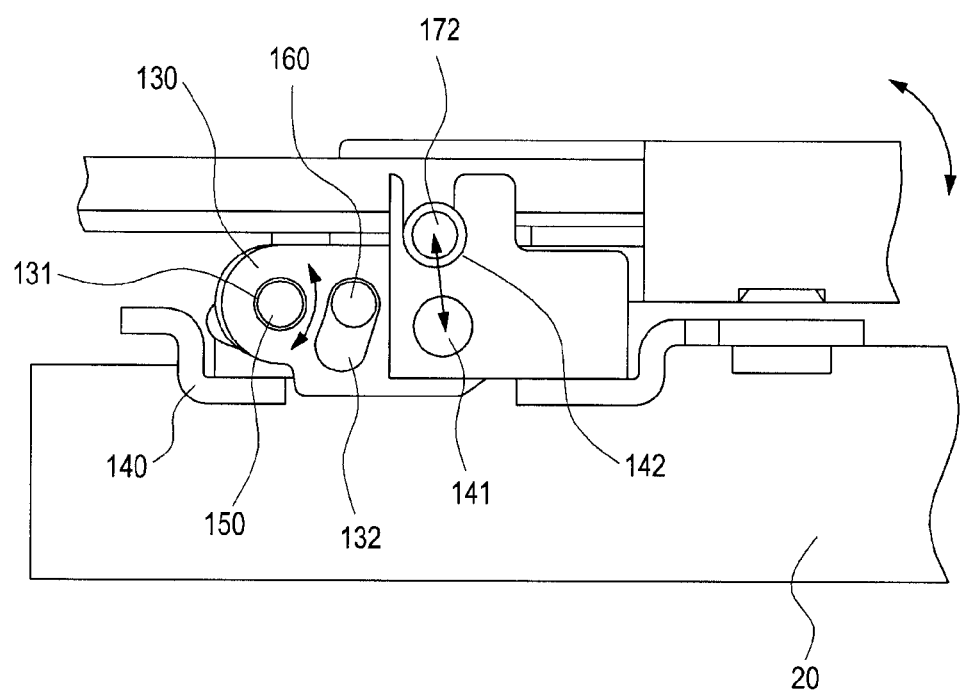
FIG. 18 is an enlarged side view showing the inventive cradle prior to operating it.
Figure 19:
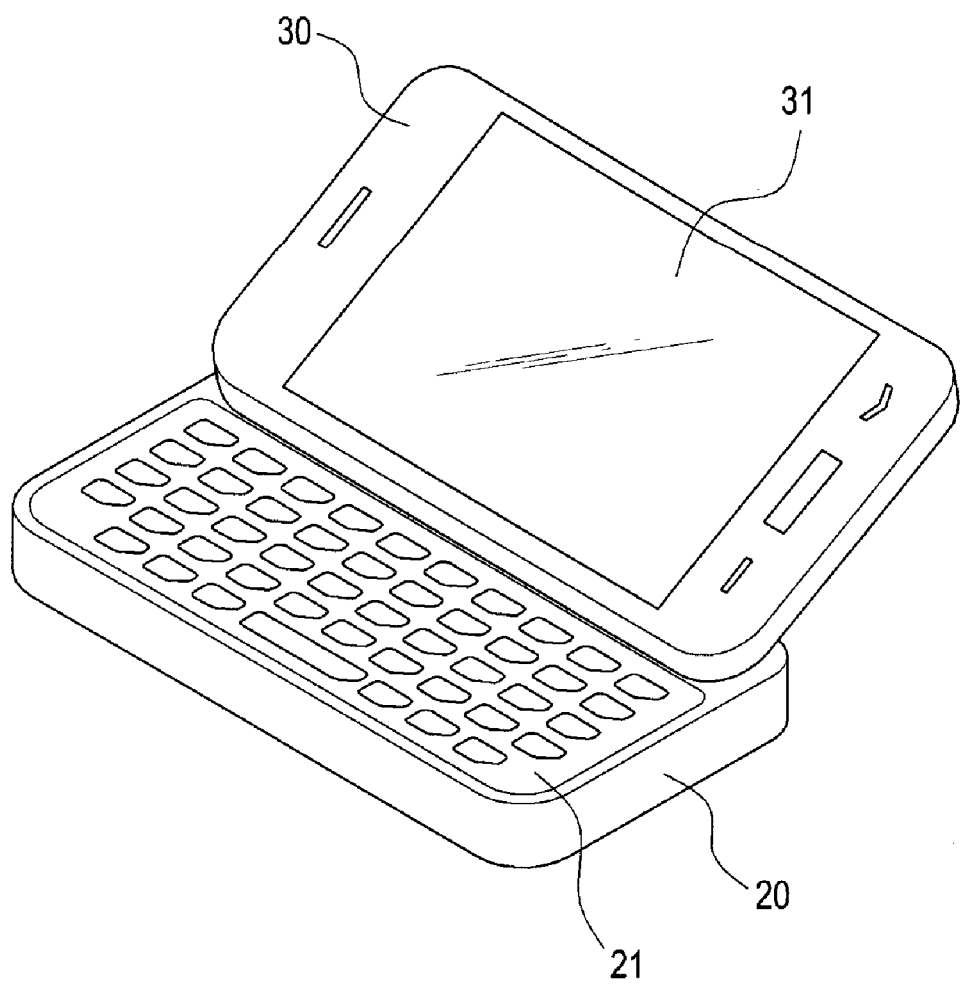
FIG. 19 is a perspective view showing a portable terminal after the second housing has been slid and cradled.
Figure 20:
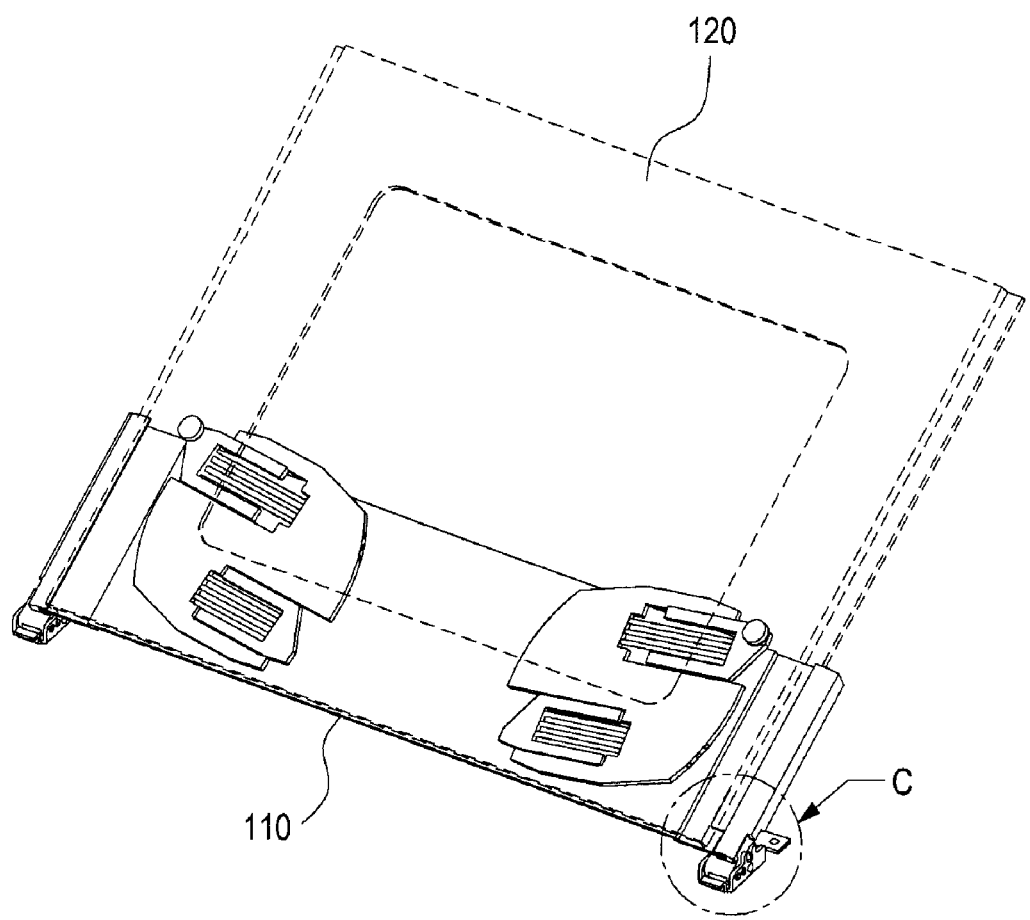
FIG. 20 is a perspective view showing the inventive cradle after the second housing has been slid and the first and second members have been cradled.
Figure 21:
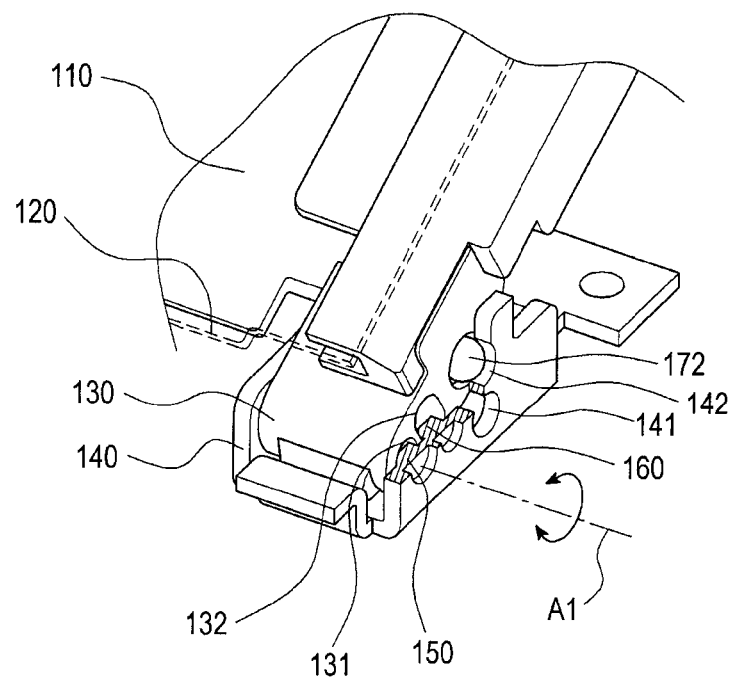
FIG. 21 is an enlarged perspective view of the "C" part in FIG. 20.
Figure 22:
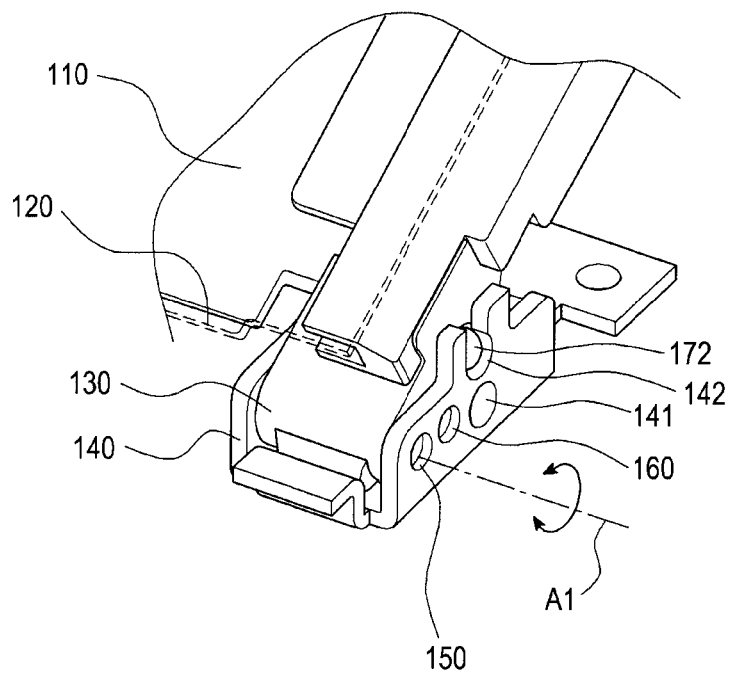
FIG. 22 is an enlarged and partially sectioned perspective view of the "C" part in FIG. 20.

As shown in FIG. 18, the stopper 132 of the first rotary link 130 is also rotated, and comes into contact with the link stopper 16, which is integrally formed with and protrudes from the second rotary link 140, whereby the stopper 132 limits the rotation of the first rotary link 130.

Figure 8:
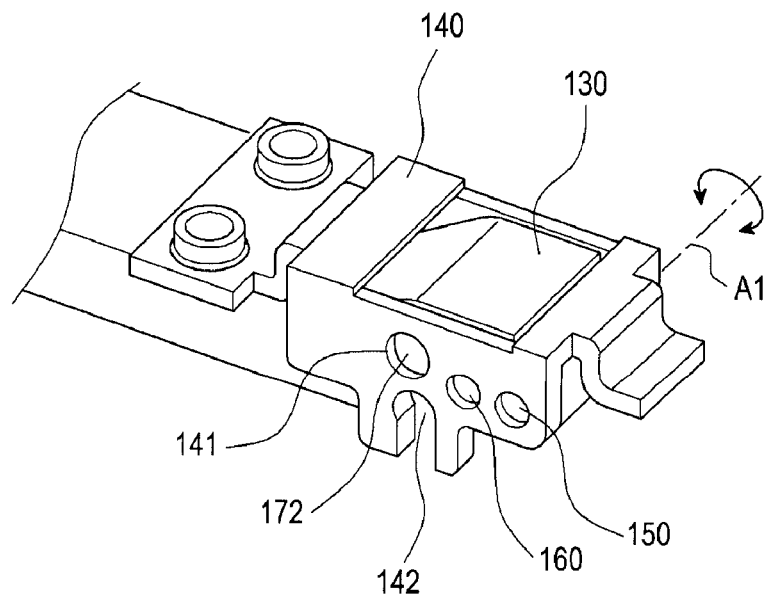
FIG. 8 is a perspective view showing the cradle of FIG. 4 in an assembled state.
Figure 9:
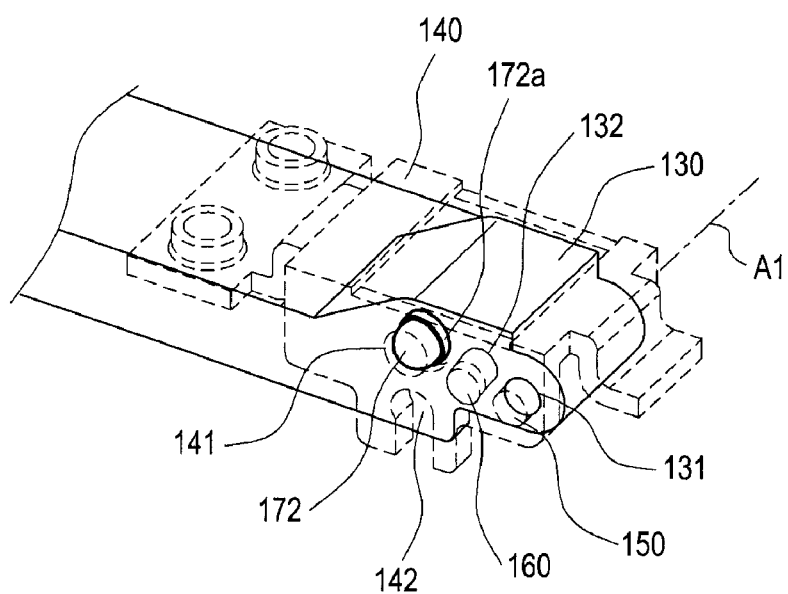
FIG. 9 is a perspective view showing the internal configuration of the cradle of FIG. 8.

As shown in FIGS. 8, 9 and 18, the click lug 172 of the click unit 170 escapes from the second engagement/disengagement hole 142, and the click lug 172 is inserted into the first engagement/disengagement hole 141, thereby being returned to its original position.

Figure 12:
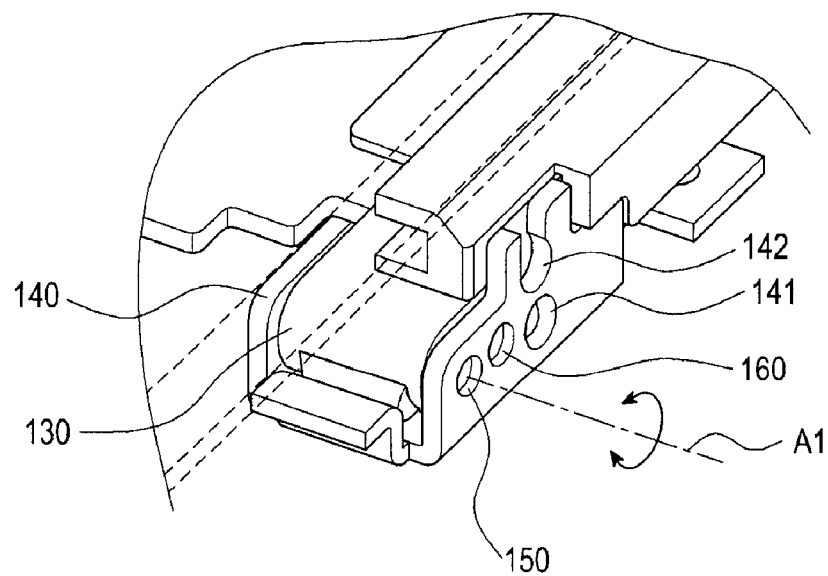
FIG. 12 is an enlarged perspective view showing the internal configuration of the "B" part in FIG. 11.
Figure 13:
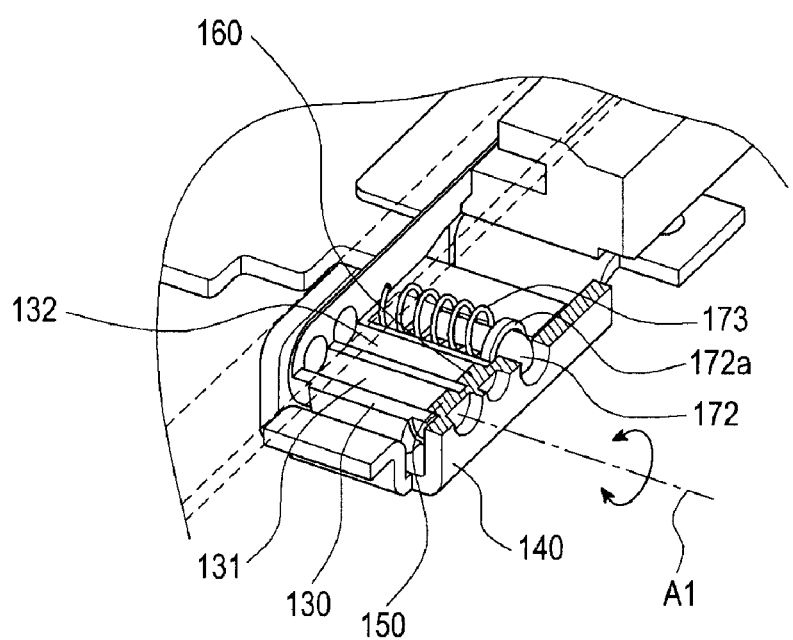
FIG. 13 is an enlarged and partially sectioned perspective view showing the "B" part in FIG. 11.
Figure 14:
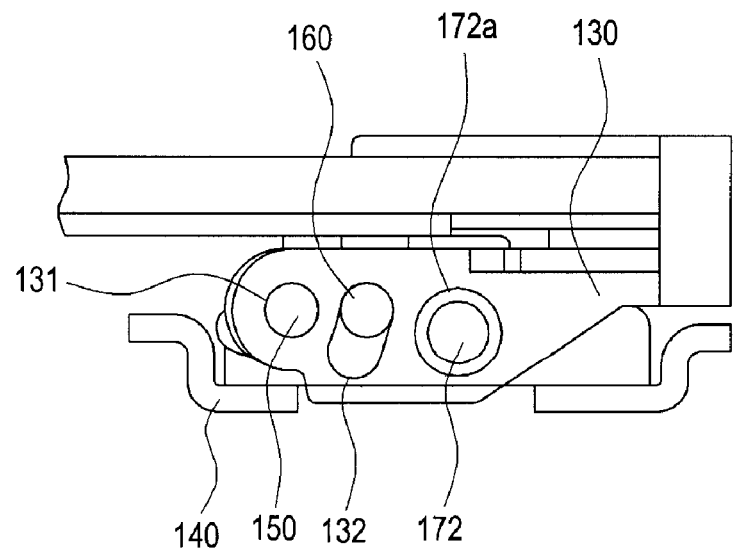
FIG. 14 is a side view of the inventive cradle prior to operation.

In this state, as shown in FIGS. 10 and 12, as the second member 120 is slid, the second housing 30 also slides, thereby being positioned oppositely in relation to the first housing 20.

As described above, according to an exemplary embodiment of the present invention, the rotary unit 150 and the link stopper 160 are integrally formed with and protrude from the second rotary link 140, so that pins and an E-ring are not required for the inventive cradle although they are essentially provided in existing conventional cradles. As a result, the number of steps and the length of time for assembling the final product can be reduced, and the manufacturing cost for the final product can be saved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A cradle for a portable terminal having a first housing with a keypad mounting area, and a second housing adapted for being cradled obliquely after being slid away from the first housing while being maintained in a position opposite the first housing, wherein the cradle comprises:

first and second members;

a first rotary link coupled to the first member, and slidably coupled to the second member, the second member adapted for rotation about a rotary axis to position the first and second members obliquely after the second member is slid away from the first member;

a second rotary link rotatably coupled to the first link and supporting the first link;

a rotary unit formed integrally with and protruding from the second rotary link, the rotary unit having the rotary axis, and being coupled to a rotary hole formed in the first rotary link so as to allow the first rotary link to be rotated; and a link stopper formed integrally with and protruding from the second rotary link, the link stopper being coupled to a rotary link stopper formed on the first rotary link so as to limit the rotation of the first rotary link.

2. The cradle as claimed in claim 1, wherein the first rotary link is includes a click unit in a coupling hole formed in the first rotary link, the click unit being engaged with or disengaged from first and second engagement/disengagement holes formed in the second rotary link when the first rotary link is rotated, such that the click unit supports the first rotary link while limiting the rotation of the first rotary member, and provides a click feeling when the first rotary link is rotated.

3. The cradle as claimed in claim 1, wherein the click unit comprises:

a coupling hole formed in the first rotary link;

a click lug being movable in the coupling hole in a position to correspond to the first and second engagement/disengagement holes, the click lug adapted for engagement with or disengagement from the first and second engagement/disengagement holes, and for providing a click feeling when the first rotary link is rotated; and an elastic member arranged in the coupling hole to provide a biasing means for allowing the click lug to be engaged and disengaged.

4. The cradle as claimed in claim 3, wherein the click lug is formed in a substantially semispherical shape, and an anti-escaping ridge is formed on the click lug for preventing the click lug from escaping from the coupling hole.

5. The cradle as claimed in claim 3, wherein the click lug is formed from a stainless steel material.

6. The cradle as claimed in claim 1, wherein the rotary unit is formed by a rotary lug for rotation in the rotary hole, and the link stopper is formed by a stopper protrusion to limit the rotation of the first rotary link by contacting the first rotary link when the first rotary link is rotated in the link stopper.

7. The cradle as claimed in claim 1, wherein the first and second rotary links are formed from a carbon tool steel material.

8. The cradle as claimed in claim 1, wherein the rotary unit and the link stopper are formed with guide slopes for guiding engagement with the first rotary link.

9. A method of making a cradle for a portable terminal having a first housing with a keypad mounting area, and a second housing adapted for being cradled obliquely after being slid away from the first housing while being maintained in a position opposite the first housing, comprising the steps of:

providing first and second members;

coupling a first rotary link to the first member, and slidably coupling the first rotary link to the second member, the second member adapted for rotation about a rotary axis to position the first and second members obliquely after the second member is slid away from the first member;

coupling a second rotary link rotatably to the first link and supporting the first link;

forming a rotary unit integrally with and protruding from the second rotary link, the rotary unit having the rotary axis, and being coupled to a rotary hole formed in the first rotary link so as to allow the first rotary link to be rotated; and integrally forming a link stopper with and protruding from the second rotary link, the link stopper being coupled to a rotary link stopper formed on the first rotary link so as to limit the rotation of the first rotary link.

10. The method of claim 9, wherein the first rotary link includes a click unit in a coupling hole formed in the first rotary link, the click unit being engaged with or disengaged from first and second engagement/disengagement holes formed in the second rotary link when the first rotary link is rotated, such that the click unit supports the first rotary link while limiting the rotation of the first rotary member, and provides a click feeling when the first rotary link is rotated.

11. A cradle assembly for a portable communication terminal according to the process of claim 9.

* * * * *

UNITED STATES PATENT AND TRADEMARK OFFICE
CERTIFICATE OF CORRECTION

PATENT NO. : 8,382,055 B2
APPLICATION NO. : 13/112055
DATED : February 26, 2013
INVENTOR(S) : Hae-Won Ahn et al.

It is certified that error appears in the above-identified patent and that said Letters Patent is hereby corrected as shown below:

In the Claims

Column 7, Claim 2, Lines 29-30 should read as follows:
--...first rotary link includes a click...--

Signed and Sealed this
Ninth Day of July, 2013

Teresa Stanek Rea
*Acting Director of the United States Patent and Trademark Office*